April 10, 1951 O. KORNEI 2,547,948
PROCESS FOR FORMING MAGNETIC RECORD MEMBERS FROM A PAPERMAKING FIBER SLURRY
Filed July 21, 1947
2 Sheets-Sheet 1
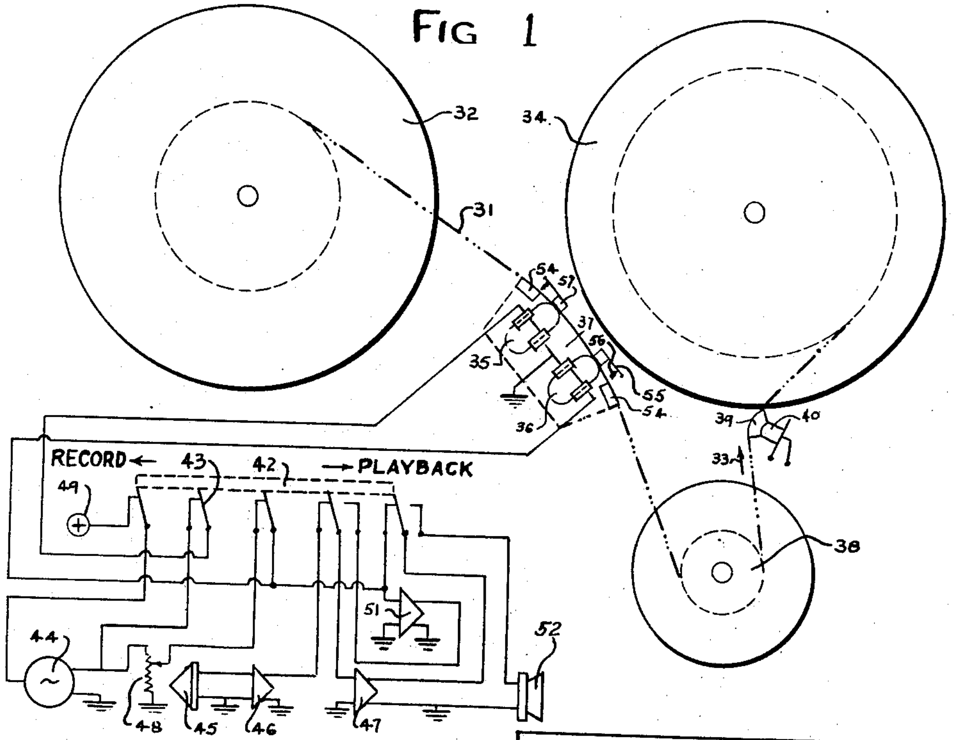
FIG 1
FIG 2 FIG 2-A
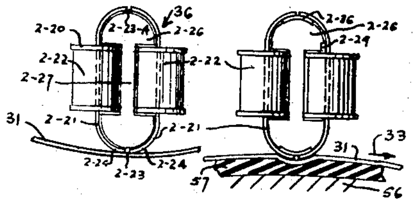
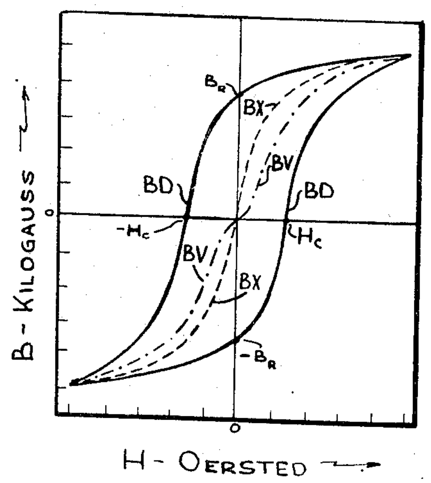
FIG 5
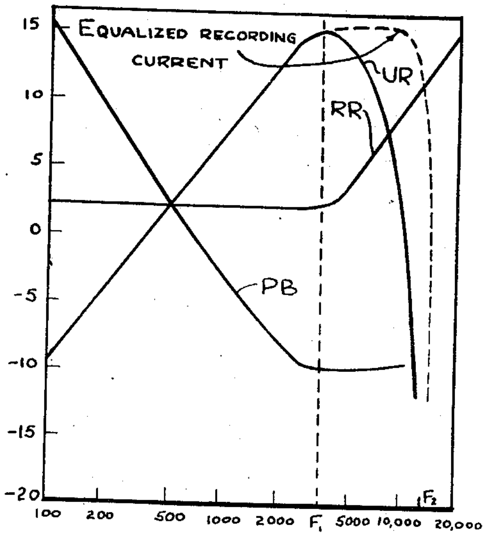
FIG 9
INVENTOR
OTTO KORNEI
BY Elber J. Hyde
ATTORNEY FIG 3
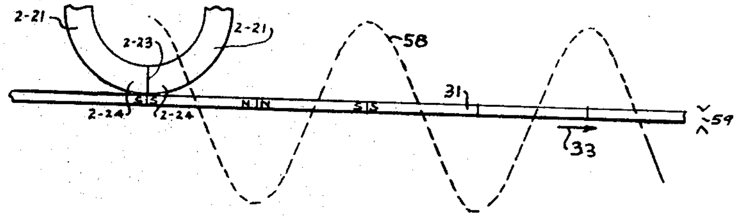
FIG 4
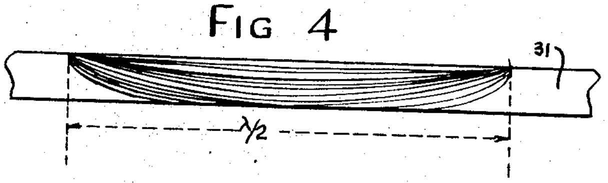
FIG 8
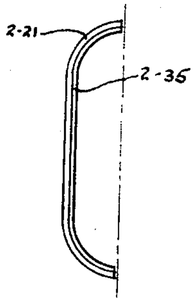
FIG 4-A
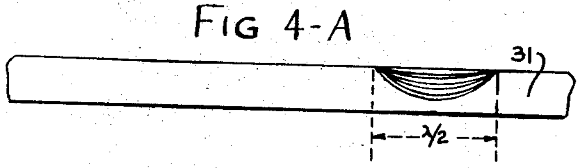
FIG 6
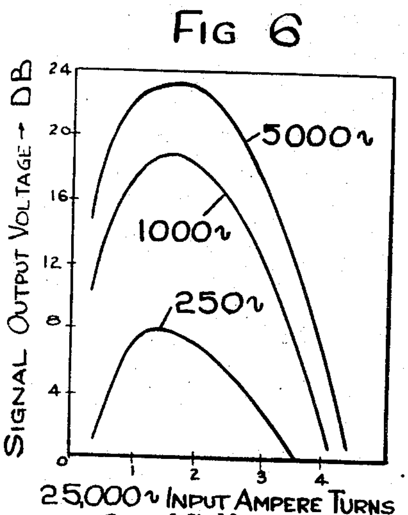
FIG. 10
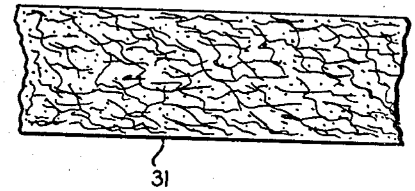
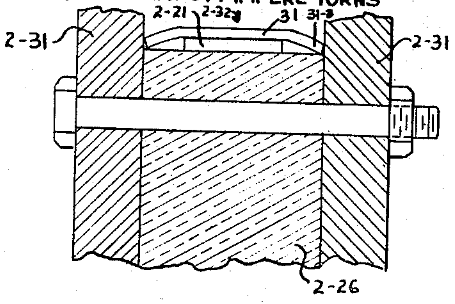
FIG 7
INVENTOR
OTTO KORNEI
BY Eber J. Hyde
ATTORNEY Patented Apr. 10, 1951

2,547,948

UNITED STATES PATENT OFFICE 2,547,948

PROCESS FOR FORMING MAGNETIC RECORD MEMBERS FROM A PAPERMAKING FIBER SLURRY

Otto Kornei, Cleveland Heights, Ohio, assignor to The Brush Development Company, Cleveland, Ohio, a corporation of Ohio Application July 21, 1947, Serial No. 762,463

3 Claims. (Cl. 92—21)

This application is a continuation-in-part of application Serial No. 685,093, filed July 20, 1946, now abandoned.

This invention relates to magnetic record transducing and more particularly to magnetic record transducing systems and methods in which magnetic signals are recorded and reproduced by magnetic flux interlinkage between a magnetic record transducing head and successive elements of a relatively moving magnetic recording medium.

Among the objects of the invention are novel features of such recording system and method utilizing as a recording medium a record sheet member having a relatively extended exposed magnetic record track surface formed of permanently magnetizable particles substantially uniformly distributed in a self-supporting stratum.

The foregoing and other objects of the invention will be best understood from the following description of exemplifications thereof, reference being had to the accompanying drawings wherein:

Fig. 1 is a diagrammatic view of a magnetic recording equipment used in connection with the recording system of the invention;

Figs. 2 and 2—A are diagrammatic views of two forms of magnetic transducer head arrangements for recording equipment of the type shown in Fig. 1;

Figs. 3 to 6 are explanatory diagrams of the operating characteristics of the various elements of a magnetic recording system;

Fig. 7 is a cross-sectional view of a record transducer head;

Fig. 7 is a side view of one form of pole piece arrangement of a transducer head;

Fig. 9 is a curve diagram illustrating one method of practicing the invention; and Fig. 10 is a magnified view of a portion of a record member of the invention.

Fig. 1 illustrates in a simplified diagrammatic manner the principal elements of a magnetic recording system in connection with which the principles of the invention will be described. An elongated recording medium or record member, in the form of a flat tape 31, is shown impelled from reel 32 in the direction of the arrow 33 toward the reel 34. In moving from supply reel 32 toward reel 34, each element of the recording medium 31 passes in succession past the elements of a magnetic erasing or obliterating head 35, then past the elements of a magnetic record transducing head 36, which are shown mounted on a common guide and supporting structure 37, then over the periphery of a pulley 38 combined with a fly wheel member, and therefrom over a guide surface portion 39 of a limit switch 40 before reaching the take-up reel 34.

The two reels 32, 34 and the drive pulley 38 with its fly wheel form part of a reeling mechanism which makes it possible to move the tape past the transducer head 36 at a constant speed. Both in recording and reproducing, the recording medium 31 is guided past the magnetic record transducer head 36 in the direction of the arrow 33 from left to right, the reeling mechanism being provided with means for rewinding the recording medium on reel 32 before carrying on another recording operation or before each reproducing operation.

The other features of the recording apparatus are more completely described in the copending application, Serial No. 690,878 filed August 16, 1946 (issued as Patent 2,535,486 on December 26, 1950), by A. P. Dank, in which practical arrangements are shown.

In use, the recording and reproducing operations are carried on under the control of a multiblade recording switch 42 which may be moved from the recording position shown, in which it establishes the recording circuits, to the opposite position, in which it establishes the reproducing circuits. When the switch 42 is in the recording position shown, the windings of the obliterating head 35 are connected by switch blade 43 to a source of high frequency oscillations 44, the circuit being completed by the ground connection shown.

The high frequency obliterating current supplied to the erasing head 35 is of sufficiently large amplitude so that each element of the moving magnetic tape passing through an obliterating head is subjected to an alternating flux sufficient to erase any previous magnetic signal record of the moving medium and restore the magnetic elements thereof to a magnetically neutral condition.

After being subjected to a magnetic erasing action by the erasing head 35, each element of the moving recording medium 31, upon reaching the record transducing head 36, is subjected thereby to a magnetic recording flux produced by amplified signal currents from a signal source, such as a microphone 45, and a superimposed high frequency biasing flux component produced by a high frequency current component supplied by the oscillator 44. The electrical signal currents of the microphone 45 are supplied to the transducer head 36 by way of the preliminary recording amplifier 46, the main amplifier 47 and contact blades of the recording switch 42. The high frequency bias component is supplied to the transducer head 36 from the oscillator 44 by way of a variable resistor 48 and another blade of the recording switch 42.

To reproduce a recorded signal while the recording medium moves from left to right in the direction of the arrow 33, the recording switch 42 is actuated to the righthand reproducing or playback position. In this position, the oscillator 44 is disconnected from its power supply source indicated by the (+) sign 49, and no erasing and biasing currents are supplied to the erasing head 35 and transducer head 36.

Furthermore, the windings of the transducer head 36 are disconnected from the output of the main amplifier and are instead connected to the reproducing circuit shown formed by the main amplifier and preliminary playback amplifier 51, the playback final output being impressed on a loudspeaker or an analogous sound reproducing device 52. The preliminary recording amplifier 46 and the preliminary playback amplifier 51 may be used to adjust the recording and playback frequency spectrum to the desired values as more fully shown below in connection with Fig. 9. Such frequency distribution adjustment may, however, be obtained in the recording or playback circuits by using a combined recording amplifier that is completely separate from the playback amplifier in which case the necessary amplification and frequency spectrum adjustment may be obtained with a single amplifier in each circuit. However, if the complete frequency spectrum adjustment is not desired the apparatus of the invention may omit one or both preliminary amplifiers. Furthermore, in practical applications, arrangements other than that shown are used for mixing the superposed high frequency bias current with the recording signal current impressed on the recording head during the recording operation.

Resilient pads 57 which may be of felt are shown as urging the recording medium 31 against the heads 35 and 36 by the spring members 56 acting against the pad holders 55. Such urging helps to insure a positive and uniform contact between the magnetic recording medium and the transducing heads so that the magnetic linkage between them remains substantially constant. However, by increasing the tension on the moving medium, uniform contact and constancy of magnetic linkage will result from the urging of the tensile stress without the use of the pads. The increased tension, however, makes for a shorter life of the moving medium. When the pads are used they may be arranged to be lifted away from the moving magnetic medium during its rewinding which takes place at a speed much higher than the recording. As an example, recorders are being made which rewind a thirty minute reel in one minute.

Fig. 2 shows the general arrangement of a magnetic record transducer head 36 suitable for use in magnetic recording systems of the invention. It comprises a magnetic core structure shown formed of two like pole piece elements 2—21 and transducer windings shown formed of two like coils 2—22, one for each pole piece element. The two pole pieces 2—21 are shown formed of strips of highly permeable magnetic sheet metal having pole tip ends separated by a non-magnetic gap 2—23, the pole tips being bent to provide two convexly curved pole faces 2—24 longitudinally aligned on the opposite sides of the gap 2—23 and arranged so that a tensioned flexible recording medium, such as the tape 31, moving past the transducer head, will be flexed into engagement with the convex pole faces 2—24 to assure that positive stable contact conditions are maintained between the pole face portions 2—24 adjoining the gap 2—23 and the elements of the record track surface of the record member 31 moving past the same.

The two pole pieces 2—21 are held in their operative position by uniting them to the opposite sides of a substantially rigid mounting member 2—26 having an intermediate section 2—27 of reduced width providing recesses within which the winding coils 2—22 are seated. The two pole pieces 2—21 form with the mounting member 2—26 to which they are united a self-contained double-pole piece unit. The two pole pieces 2—21 form a substantially closed magnetic circuit including, in addition to the working gap 2—23, a symmetrical non-magnetic gap 2—23—A so that each core section or pole piece of the magnetic core structure and its surrounding winding coil 2—22 is magnetically substantially alike and symmetrical with respect to each other in order that they shall form two electromagnetically balanced structures which are symmetric with respect to their two gaps, so that an external disturbing stray flux traversing the two sections will induce in the interconnected winding sections voltages which are substantially opposite in phase and equal in magnitude so that they cancel, although the interconnected windings are very efficient in reproducing signals recorded on a magnetic recording medium moving past one of its gaps or for making a new recording.

The winding coils 2—22 are shown held on bobbins 2—20 which may be molded of a synthetic resin insulating material and may be provided with a slit for seating therein the pole piece units 2—21 before the windings are wound on the coil. Although, in the form shown in Fig. 2, the magnetic core structure of the transducer head is formed only of two like pole piece elements 2—21, each pole piece element may be made of two equal halves cut in the middle so as to make it possible to insert the straight arm of each half pole piece into the bobbin slit on which the coil has been previously wound.

The erasing head 35 shown in Fig. 1 may be made substantially identical with the transducer head 36, such as described in connection with Fig. 2. As indicated in Fig. 1, the common supporting and guide structure 37 on which the erasing head 35 and transducing head 36 are mounted, are provided with guide surface elements 54 along which the moving recording medium 31 is guided past the pole faces of the erasing head 35 and the transducer head 36 so that each element of the recording medium is flexed into positive contact engagement with the convex pole faces of opposite polarity aligned on the opposite side of the pole gap. Such positive contact engagement of the successive elements of the moving recording medium with the convex pole faces of a magnetic head structure may also be assured if, as indicated above with respect to Fig. 1, a movable flexible magnetic record sheet member, such as the tape 31, is guided over a support engaging one side thereof, while the other side is engaged by the convex pole faces 2—24 of the transducer head.

Fig. 2—A shows another form of such arrangement. A limp flexible magnetic record tape 31 is guided in the direction of the arrow 33 over a substantially rigid supporting member 56 having a surface layer 57 of yieldable cushion-like material, such as rubber or felt, which permits limited flexing of the flexible record tape 31 into engagement with the convex pole faces 2—24 of the transducer head structure which is suitably supported and held biased against the moving tape and its supporting member 56. For instance, if a double-pole-piece unit, such as shown in Fig. 2—A, is held on an arm, generally similar to the arms used in supporting the pickup of standard phonographs, the supporting arm may be combined with a weight or a spring for subjecting such double-pole-piece unit to biasing forces which cause the pole faces 2—24 to flex the portions of the record track sheet member 31 into engagement with the convex pole faces of the transducer head.

When using an arrangement of the type shown in Fig. 2—A, in order to provide the desired cushioning effect which causes the record sheet member 31 to be flexed into engagement with the convex pole faces of the transducer head, the record sheet member 31 may embody in itself sufficient yieldability so that when engaged by the convex pole faces biased thereagainst, it will permit slight deformation of its exposed record track surface as it engages the convex aligned pole faces while the record track sheet member 31 is moving relatively thereto in the manner indicated in Fig. 2—A. For instance, the record sheet member 31 may be made of a flexible material, such as paper or synthetic resin, which provides the required degree of flexibility and cushioning.

In making magnetic records on a moving elongated recording medium with a transducer head arranged in the general manner shown in Fig. 2, the recording signal currents supply to the transducer head a corresponding magnetic flux which impresses corresponding magnetizing fields on short incremental elements of the moving magnetic recording member 31 bridging the pole gap 2—23.

In general, when a constant signal current of sinusoidal wave form and of a given frequency is used for making a record, the magnetic medium emerging from the gap is left with a continuous succession of magnetized elements or elemental magnets as indicated in Fig. 3, in which the individual elemental magnets of the recording medium are shown separated from each other by transverse lines and are marked with N and S to designate their north and south poles.

The length of the incremental elements of the moving magnetic recording members which are subjected to the magnetic field of the recording head, is determined primarily by the width of the gap 2—23 separating the pole faces of the recording head.

Under ideal conditions, the distribution of the magnetic field over the length of each increment of the recording medium moving past the pole gap should be as uniform as possible, and should approach a rectangular shape. However, because of magnetic leakage, the shape of the field impressed by the gap region of the magnetic head on the recording medium is never rectangular but it spreads beyond the width of the physical gap separating the pole pieces so that the width of the effective recording gap or slit is greater than the actual physical pole gap of the magnetic head.

In each magnet element so formed in the recording medium, the longitudinal magnetic flux will vary sinusoidally in the manner indicated in Fig. 3 by the dash line 58. The distance between two successive opposite flux maxima is equal to one-half of the recorded wave length and may be considered as the length of equal but oppositely polarized elemental bar magnets formed in the recording medium. In general, for the medium and low frequency range of recorded signals, the thickness of the elemental magnets so formed in the recording member 31 will be substantially equal to the thickness of the recording medium indicated at 59, but the thickness of the magnets formed in the recording medium will decrease with increasing frequency, thereby reducing the effectiveness of the recording process in recording signals of higher frequencies.

In the reproducing or playback process, the succession of elemental magnets represented by the moving magnetic recording medium will induce in the magnetic core structure a correspondingly varying magnetic flux, which, under linear conditions, should be directly proportional to the magneto-motive force existing along the record member of a length equal to the effective pole gap width of the playback head. The voltage generated in the windings of the head is proportional to the rate of change of the flux through the magnetic circuit of the head.

It can be shown that the voltage generated in the reproducing head rises with the frequency at the rate of about 6 db. per octave until it reaches a peak value, the generated voltage dropping with a further rise in the frequency of the recorded signals.

The drop in the playback voltage at the higher frequencies is caused by the fact that, with rising frequency, the penetration of the magnetic recording flux into the magnetic recording medium decreases and the magnetic poles in the recording medium become closer together.

Figs. 4 and 4—A indicate the character of the penetration of one half wave of the recording flux into a magnetic recording medium of a given thickness for low frequencies and high frequencies, respectively, when recording with constant flux or recording current. It can be seen that, although the full depth of the recording medium is penetrated by the recording flux of a low frequency signal, as indicated in Fig. 4, the recording flux penetrates substantially less into the recording medium at the higher signal frequencies, as indicated in Fig. 4—A.

The shortening of the distance between the poles results in an increase in the demagnetization caused by the presence of an air gap in a magnetic circuit. It is well known that the magnetization of a magnetic circuit including an air gap does not follow the normal magnetization curve which is conventionally plotted from data obtained with closed magnetic circuits having no non-magnetic portions. It is also well known that this demagnetization effect on a bar magnet increases with the shortening of the magnet length. For further explanation attention is directed to pages 59 to 61 of Spooner "Properties & Testing of Magnetic Materials," published 1927 by McGraw Hill Book Co., Inc.

Although it was known that, theoretically, the magnetic gap between the pole faces must be smaller than one wave length of the highest recorded frequency, it was recognized that the demagnetization effect described above controls the limit of the high frequency response, and that reducing the pole-face gap below one or two mils was of no advantage, and, in practice, all prior ring-type magnetic heads had a gap of about two mils.

To obtain good quality, it is desirable that a linear or distortion-free relationship shall be maintained between the magnetic recording field of the recording head and the magnetic induction effected by it in the recording medium. It is well known that the magnetization curve or the relationship of the magnetizing field to the magnetic induction in ferro-magnetic materials is not linear.

Fig. 5 shows typical magnetization curves of a ferro-magnetic material. If a magnetically neutralized magnetic material is subjected to a magnetizing action, its magnetization will follow the normal or virgin magnetizing curve BV. Curves BD are the two branches of the hysteresis loop or the magnetization curve for a full magnetizing cycle between conditions of magnetic saturation in opposite directions.

The normal magnetization curve BV exhibits a pronounced bend in the range of the lower magnetizing forces, and if the magnetic recording process is carried on under conditions represented by such bent curves, considerable distortion will arise. To eliminate this source of distortion, Poulsen superposed a D. C. biasing field on the recording field. When recording with D. C. bias, the magnetic recording medium is first magnetized to saturation, and then subjected to the combined action of the D. C. bias field which reduces the magnetization of the medium along a branch of the hysteresis loop to a straight portion thereof, and to the action of the alternating flux of the recorded signals so that the recorded signals vary the magnetization of the recording medium linearly along the substantially straight portion of the hysteresis loop, such as shown at BD in Fig. 5.

It was also long known that better results are obtained if in lieu of a D. C. biasing field, a high frequency alternating current (A. C.) biasing field is superimposed on the recording field as described, for instance, in U. S. Patent 1,640,881 of Carlson et al., and in the article published by K. Nagai et al. in the Journal of The Institute of Electrical Engineers of Japan, March, 1938, pages 144 to 148. The beneficial effect of the A. C. biasing field is due to the long known fact that when a magnetic material which is exposed to an alternating field of a higher frequency is subjected to additional magnetizing action, the two branches of the hysteresis loop, representing the additional magnetizing action, tend to come together and then collapse with the rise of the high frequency field into a line curve, such as shown by the dash line curve BX in Fig. 5.

When recording with A. C. bias, the magnetic recording medium is first restored to a magnetically neutral condition and then subjected to the combined action of the high frequency biasing field and of the varying field of the recorded signals which appear to vary the magnetization of the recording medium on the substantially straight portion of the single-line magnetization curve obtained by the presence of the A. C. biasing field. It should also be noted that the beneficial effect of the A. C. biasing flux is obtained even if its direction is at right angles to the recording flux passing through the recording medium. A single source of high frequency oscillation may be used to supply high frequency alternating magnetizing currents to a record erasing head which restores the recording medium to a neutral condition and for superimposing the proper A. C. biasing field on the recording field of the recording head. In general, the A. C. biasing should be of a frequency about two or more times as great as the highest frequency of the signals which are to be recorded. Good results are obtained when employing a biasing frequency three times as great as the highest frequency to be recorded.

The curves in Fig. 6 show the results obtained with a recording system in which a magnetic recording medium in the form of a paper tape coated with a bonded magnetic oxide layer was subjected to the flux of constant current recording signals of various frequencies and of a superimposed varying current field of 25,000 cycles per second. The curves are labelled as to the signal frequency used and show the playback output obtained as the superimposed biasing current increases from very low values. As seen from these curves, there is an optimum value of the superimposed high frequency flux at which a signal of a given frequency may be recorded and played back at a maximum level, and that with the rise of the strength of the high frequency bias flux beyond an optimum value, it will exert a rising obliterating action. In general, the flux of the high frequency biasing field is only a fraction of the magnitude required to effect erasure or magnetic neutralization of the recording medium.

In order to operate the magnetic recording system to best advantage, the magnitude of the superimposed high frequency field must be suitably adjusted to the magnetizing field of the signals which are to be recorded. The foregoing considerations show that the A. C. erasing flux of the erasing head must be much stronger than the optimum A. C. bias flux, and that, depending on the characteristics of the magnetic recording medium, there is an optimum value of the high frequency bias flux at which a given magnetic recording head will record the desired signals with a desired minimum distortion as well as optimum level.

The recording circuit is provided with means for adjusting the A. C. biasing flux to its optimum value, such adjusting means being indicated in Fig. 1 in the form of the variable resistor 48.

In general, both the D. C. bias and the A. C. bias methods of magnetic recording give essentially similar frequency response curves. However, the A. C. biasing method of magnetic recording gives a higher signal-to-noise ratio. To obtain good signal-to-noise ratios with a D. C. bias method, it is essential to assure that when recording and in the absence of a recording signal, when the recording medium is subjected only to the D. C. biasing field, there is no variation in the biasing flux or the magnetic condition of the recording medium since such variation would leave spurious signals recorded. Such unvarying conditions can be approximated when a solid homogeneous magnetic recording medium is used, such as a solid magnetic wire or tape, and extremely stable contact conditions between the recording medium and the pole faces of the recording head are maintained.

If it is desired to produce magnetic records of good quality and an optimum signal-to-noise ratio, it is essential that the magnetic record process is carried on with an A. C. biasing field. This is due to the fact that during recording and in the absence of a recorded signal, the magnetic recording medium approaches and leaves the recording head in an essentially demagnetized state in which mechanical disturbances in the contact conditions or non-uniformities of the magnetic recording medium would leave no record.

In general, the effect of the relative velocity between the magnetic recording medium and the record transducing head is governed by the following consideration: As explained above, in connection with Fig. 3, a signal of a certain frequency recorded at a given velocity of the recording medium, forms therein a continuous succession of elemental magnets which may be represented by sinusoidal magnetic waves of a given wave length extending along the magnetic recording medium. In the playback process, the output voltage of such magnetic record wave of a given frequency will be proportional to the velocity of the recording medium, if secondary effects due to hysteresis losses and skin effects are neglected.

Consequently, the playback voltage of a given recorded wave length plotted against the velocity of the recording medium will be represented by a straight line rising with the frequency at about 6 db. per octave. Since the same consideration applies, in general, to a signal of any given frequency or wave length, it follows that by changing the velocity of the recording medium, the shape of the response curve will remain the same, but its new position relative to the axis with respect to which the response curve is plotted, will be shifted along a 6 db. per octave line until the horizontal distance between the new and original response curve corresponds, in the conventional logarithmic frequency plot, to the ratio of the new and original velocity of the recording medium. Accordingly, a reduction of the velocity in the recording medium reduces the playback voltage of the recorded signal. On the other hand, it is generally desirable to record with lowest possible velocity because the mechanical problems of driving the recording medium are simplified and a record of greater duration may be stored in a shorter length of the recording medium.

With prior magnetic record members of the magnetizable powder type it has been the universal practice to provide an extremely thin top bonded coating of magnetizable material supported by and attached to a base member as a separate stratum. The prevailing tendency is to keep the magnetizable layer as thin as possible in the belief that this was necessary for faithful recording and reproducing action. It has been discovered, however, that a magnetizable powder of extremely small particle size may be incorporated in and distributed through the fibers of a stratum of fibrous material such as paper to form a very effective magnetic record member even though the fibrous material is two or three mils thick.

In the recording system of the present invention, the magnetic recording medium of the recording member, such as the tape 31, is formed of finely powdered magnetizable particles having a particle size of the order of one micron or less, held dispersed in a recording medium moved along the pole faces of a magnetic head, such as indicated in Fig. 2, the magnetic powder particles of the layer being exposed along a magnetic record track surface of the recording medium to the recording flux impressed thereon by the pole faces of the recording head. Very excellent recording media of the foregoing type may be made with magnetizable powders, such as magnetizable powders, such as magnetite $Fe_3O_4$, $\gamma$-ferric oxide $Fe_2O_3$, oxides of cobalt or, in general, permanently magnetizable oxides of ferromagnetic metals or complexes or mixtures thereof.

More particularly, the commercially available magnetic pigment powders, such as magnetite and $\gamma$-ferric oxide, have the desired small particle size of the order of one micron or less and have the magnetic characteristics which render them suitable for an excellent magnetic recording medium of the foregoing type.

The magnetic recording medium shown is a film of strong self-sustaining material such as paper or other fibrous composition having finely dispersed therethrough in a substantially uniform manner along at least one face a permanently magnetizable powder.

When a magnetic recording medium formed of a layer of powdered magnetic particles, which inherently exhibits slight local irregularities in the distribution of the magnetic particles, is subjected only to the D. C. biasing field during a recording operation, it will leave the recording head in a non-uniform magnetic state. When played back such recording will produce noise and, in the presence of a signal, relatively low signal-to-noise ratio. Accordingly, when recording on a magnetic recording medium containing dispersed magnetic powder, the use of a D. C. biasing field is much more objectionable than when recording on solid magnetic media, and the A. C. bias methods must be used in order to obtain a good signal-to-noise ratio with such recording medium.

However, when recording with A. C. bias, serious problems are encountered because high frequency magnetic biasing flux does not as readily penetrate through the magnetic recording medium as the longer wave length flux. This factor was explained above in connection with Figs. 4 and 4—A.

In other words, when a magnetic head impresses a high frequency biasing flux on a magnetic powder particle layer forming the magnetic recording medium, the high frequency biasing flux will have to be of a certain minimum amplitude to penetrate as deeply into the interior of the layer as the recording flux, and the flux density of the high frequency biasing flux will decrease with the distance of the layer particles from the region of their contact with the pole faces of the head. Signals of the very low frequency range which have to be recorded and reproduced, will penetrate a powdered magnetizable particle layer to a very great extent. Accordingly, if the layer of powder particles is too thick, difficulties are encountered in producing good quality magnetic records because the high frequency biasing flux does not penetrate as deeply into the layer as the low frequency recording flux. If the high frequency biasing flux impressed on the powder layer is of such intensity as to completely penetrate a relatively thick powder particle layer, the field density of the bias flux in the region of the powder layer adjacent to the pole faces will be of such magnitude that it at least partially demagnetizes the adjacent powder region.

In order to obtain magnetic records of good quality and high signal-to-noise ratio, the coherent magnetic powder layer forming the recording medium must have a certain minimum thickness in order to assure a relatively uniform distribution and a substantially homogeneous dispersion. Furthermore, the powder layer must contain sufficient base to assure that the layer of the magnetic particles is mechanically stable.

The present invention provides a magnetic recording system utilizing as a recording medium permanently magnetizable powder particles held dispersed in a thin sheet, and characterized by features which overcome the foregoing and other difficulties and make it possible to provide a high quality magnetic recording system operating with a high signal-to-noise ratio comparable with the best prior art high quality disc records. The magnetic recording system of the invention, operating with such magnetic recording medium, utilizes a magnetic record transducer head having pole faces extending along one side of the exposed magnetic recording medium and separated by a non-magnetic gap of only about fifteen times the size of the magnetic powder particles, or less, or in general a gap of the order of about fifteen microns, or less.

In order to obtain with a magnetic recording medium formed of such thin layer of magnetic powder dispersed in a bonding medium a relatively high output level, it is desirable to make the records on a substantial width of such layer, and in applications where high quality records are required, such magnetic powder recording medium is made in the form of a magnetic record tape.

Such magnetic powder record tapes are formed advantageously in an economical manner by producing them in the form of a wide web, the web being subsequently cut into a plurality of individual tapes of the required width. However, magnetic powder tapes made by such process are somewhat irregular and magnetically non-uniform along their edge regions because of incidental damage in the cutting process.

According to the invention, these difficulties are avoided by making the width of the magnetic pole structure which is engaged by the moving tape smaller than the width of the tape, and the tape is so guided relatively to the pole faces that the border regions of the tape are free from engagement with the pole faces of the record transducer head along which the tape moves. By making the pole faces of the record transducer head narrower than the tape and guiding the tape in a centered position over the pole faces, the magnetic recording and reproducing process is not affected by magnetic non-uniformities in the edge or border region of the tape.

Fig. 7 is a cross-sectional view of a portion of such magnetic record transducer head. The mounting structure 2—26 of a double-pole-piece unit, such as shown in Fig. 2, is combined with a guide structure having two guide walls 2—31 which provide a guide channel 2—32 of a width greater than the transverse width of the pole faces 2—24 of the pole piece structure for guiding the relatively wide tape 31 between its border regions past the position of contact engagement with the convex pole faces 2—24 of the transducer head pole pieces 2—21, so that the border regions 31—3 of the tape are not engaged by the pole pieces.

As explained above, an essential part of the combination constituting the novel magnetic recording system of the invention is formed by a magnetic record transducer head having pole faces extending along one side of the recording medium, the pole faces being separated by a non-magnetic gap of about ten to fifteen times the size of the magnetic powder particles or less, or gap of about ten to fifteen microns or less. A magnetic record transducer head having such small non-magnetic gap separating the pole face region of the pole pieces may be provided by placing the edges of the pole pieces facing the gap in direct physical contact. Thus, a magnetic head of the type described above in connection with Fig. 2 may be provided with such small non-magnetic gap by bringing the ends of the pole pieces 2—21 facing the gap 2—23 in direct physical contact.

In order to make it possible to produce magnetic record transducer heads, the pole piece ends of which are in physical contact so as to form therebetween a non-magnetic gap of the width of the order of fifteen microns or less, the ends of the pole pieces facing each other on the opposite sides of the gap are polished and given a very fine finish so that when they are pressed together along their fine polished surfaces, they form a magnetic discontinuity which is effective as a non-magnetic gap of the order of fifteen microns or less. Such construction of a magnetic record transducer head provided with such small gap is based on the recognition of the fact that when two plane surfaces of magnetic material are placed in direct physical contact, the magnetic reluctance of the contact junction between the plane surfaces cannot be reduced to zero as might be expected. This phenomenon is caused by the fact that each plane contact surface, though polished, inherently exhibits a certain degree of microscopic roughness, and that such surfaces are usually covered by an extremely thin film of oxide and adsorbed gases so that when they are pressed into contact engagement, the junction region between such contact surfaces exhibits characteristics of a non-magnetic gap of a width of the order of several microns, such as ten to fifteen microns.

The width of the pole pieces of the erasing head may be made slightly larger than that of the transducing head. This will cause erasing of a sufficient width of the tape to insure the placing of the entire width of the recording on a magnetically neutral portion.

In making a magnetic record transducer head provided with a double-pole-piece unit of the type shown in Fig. 2, in which two pole pieces 2—21 are united to the opposite sides of a substantially rigid mounting member 2—26 in the manner described above, resort may be had to a variety of expedients. In one form of such arrangement, the two pole pieces with the coils 2—22 have their end surfaces facing the two gaps 2—23, 2—23—A finished so that when assembled and united to the opposite sides of the mounting member 2—26, the end surfaces are parallel and make physical contact along parallel polished end edge surfaces. Each of the pole pieces is given its desired shape before it is annealed and before placing thereon the bobbin and winding thereon the coil.

When using a magnetic record transducer head of the foregoing type in which the pole tip edges are placed in direct physical contact, in order to provide a non-magnetic gap of a width of the order of several microns, the level of the output obtained with such head may become too low for practical use because the magnetic reluctance between the facing pole tip ends may drop to such low value as to render the leakage flux across the gap excessive both in the recording and the playback process. This difficulty may be readily overcome by placing a very small spacer or shim of about .0002 to .0006 inch thickness between the polished pole tip edges of the pole pieces, thereby making it possible to manufacture magnetic heads having the desired small gap spacing of about fifteen microns on a regular production basis.

Best results are obtained with the apparatus of the invention when using magnetic pole pieces containing a minimum of magnetic material to minimize the iron losses. Sheet material having a thickness of the order of fourteen mils has been found to produce very good pole pieces. Thinner pole pieces are even better electrically but have mechanical inferiority and should be reenforced if necessary to avoid bending with its accompanying magnetic deterioration during assembly or use.

If the same record transducer head is used both for recording and reproducing the signals, the pole pieces 2—21 have to be made of a high permeability material, such as molybdenum permalloy. Such high permeability magnetic sheet material is relatively soft and difficult to handle. Fig. 8 shows one method of facilitating the handling of such pole pieces. Each pole piece strip 2—21 may be united to a backing strip 2—35 of stiffer material which is of the same shape and is co-extensive with the pole piece 2—21 so that they form a mechanically stable pole piece of the desired shape.

The backing strip 2—35 may be formed of a non-magnetic metal having a high electrical resistance which is united to the pole piece strip 2—21 by spot welding along a plurality of contact points. The spot welding, when applied to such pole pieces, may be carried on before carrying on the annealing process, although it has been found that a short electrical discharge required for performing a spot welding operation does not materially change the magnetic characteristics of the body of high permeability sheet elements, such as the pole pieces 2—21 which are being joined by spot welding to a backing strip, such as strip 2—35, at a plurality of spaced spots.

Alternatively, the backing strip 2—35 may be a stiff sheet element of synthetic resin material which is mechanically stable, such as linear polyamides. A satisfactory backing strip may be also provided by a layer or a plurality of superimposed thin layers of a fabric, such as nylon thread fabric impregnated with a synthetic resin to form a backing strip of the required thickness, and such strips may be readily given the desired shape conforming to the shape of the pole pieces. The pole pieces may be readily united to such backing strips by any of the known stable cements.

The pole pieces may be united to the mounting structure 2—26 in a position in which the pole end surfaces facing the gaps 2—23, 2—23—A are in physical contact engagement, by uniting the inner concave edge surfaces of the pole ends to the curved outwardly facing surface of the mounting member 2—26 along which they are assembled by placing a layer of cement between the outwardly facing surfaces of the mounting member and the inwardly facing curved surfaces of the pole pieces. Alternatively, a metallic sheet element, such as sheet element 2—36, may be placed under the inwardly facing end portions of the pole pieces bordering the gap, and the pole piece ends may be united thereto by spot welding, soldering or cementing in a position in which the end surfaces of the pole pieces facing the gaps 2—23, 2—23—A are in physical contact in the manner indicated in Fig. 2—A.

The mounting member 2—26 of such pole pieces is provided with a suitable depression in the region underlying the pole tips for receiving therein the two junction elements 2—36 joining the two pole pieces into a mechanically continuous structure. The mounting member 2—26 is so shaped that the two pole pieces 2—21 with their junction elements 2—36 and the two coils 2—22 mounted thereon may be slipped into their positions on the mounting member 2—26 in the manner shown in Fig. 2—A from one flat side of the mounting member. After the two so-joined pole piece elements 2—21 have been so-slipped into the mounting member 2—26 they may be affixed thereto by inserting thin spacer shims 2—29 of non-magnetic metal, for instance, between the stem portions of the pole pieces emerging from the coils and the adjacent facing portions of the mounting structure. The two guide walls 2—31 may be united to the opposite flat sides of the mounting structure, as by screws, in the manner indicated in Fig. 7.

The thin pole pieces 2—21 of the cores shown may be held in place against a central support 2—26 by external engaging elements instead of the holding devices shown above. External holders such as springs may be arranged to urge the pole pieces into firm contact with the central support as shown for example in the co-pending Kornei application Serial No. 688,034, filed August 2, 1946, which issued as Patent 2,523,576 on September 26, 1950, in which a practical form is more completely described.

In place of the single thickness of magnetic sheet as a record transducing or obliterating core construction, there may also be utilized a laminated construction such as an assembly of individual thin flat C-shaped pole pieces aligned to form an almost continuous ring having at least one non-magnetic gap and an external edge face along which the successive elements of the record stratum can be guided toward and away from the gap in the general manner indicated in Figs. 2 and 2—A. Such a laminated core construction is shown in the co-pending Begun application, Serial No. 688,738, filed August 6, 1946, which issued as Patent 2,513,617 on July 4, 1950, and has the advantage of being simpler to manufacture as well as sturdier and less likely to have its magnetic properties adversely affected by mechanical stresses and shocks. The operation of the novel record member of the invention with the different forms of transducing or erasing cores is otherwise substantially identical.

In accordance with the invention, the recording system used with a magnetizing medium formed of a magnetic powder layer of the type described above is designed in accordance with the following principles:

Referring to Fig. 9, a curve UR represents, as a function of the frequency, the unequalized level or response of a magnetic record made with constant recording flux on a given magnetic powder layer. In designing a recording system of the invention for recording with such magnetic powder layer at a given speed and with a given magnetic head, the following procedure is adopted:

The recording amplifier is designed so as to raise the playback response of the recording in the region beyond the peak frequency $F_1$ up to a higher frequency $F_2$. This may be done for the conditions shown in Fig. 9 by designing the recording amplifier so as to pass through the recording head a recording current, the level of which follows the curve RR and having a rising characteristic in the region from the peak frequency $F_1$ of the unequalized response up to the highest desired frequency $F_2$.

Furthermore, the playback amplifier is designed to operate with a gain represented by curve PB, the level of the gain dropping from a highest value at the lower limit of the frequency band up to the region of the frequency $F_1$ of the unequalized playback response, the level of the gain remaining substantially the same for the higher frequencies up to the highest desired frequency $F_2$.

In other words, the recording amplifier is designed to operate with a rising characteristic in the region from the peak frequency of the unequalized playback response up to the upper desired limit of the frequency range.

The playback amplifier is designed to operate with a gain which is substantially constant in the frequency range above the peak frequency of the unequalized response, the level of the gain increasing as the frequency decreases below the peak frequency of the unequalized response. With such adjustments the overall response of the playback will be uniform over the entire frequency range up to $F_2$, and speeds of less than about eight inches of recording medium per second with respect to the transducing head will give uniform frequency response in the range extending to 5000 cycles per second.

Magnetic recording media formed of thin magnetic powder layers, for instance, in the form of tapes described above may be readily spliced into a continuous recording tape of any desired length by merely cementing or gluing the end of one tape over an end portion of another tape.

It has been found that with magnetic powder films of the invention described above, the irregularity of such junction will not produce any disturbance when reproducing record made on such spliced length of tape.

According to another phase of the invention, a magnetic recording medium formed of a self supporting fibrous film containing dispersed bonded magnetic powder is provided with surface elements, label-like coating elements, for example, applied to spaced portions of the recording medium, such as a tape, for differentiating between different parts of the record made on a very long tape.

With a tape provided with such markers, the individual labels will indicate which portion of the reeled tape contains a desired recording, as indicated by the colored label mark. Such label coatings may be also formed to include a layer of metal, or, in general, an electrically conducting substance, and combined with means for automatically operating a relay which stops or starts a recording or playback process at the place on the recording medium provided with the conducting label. One suitable construction of the relay operating signal label is in the form of a thin metal foil laminated to a paper sheet coated on its exposed surface with a pressure sensitive adhesive by which the laminae can be adhered to any desired portion of the record track. The adhesive may be of the type which releasably adheres to the record so that the markers may be relocated when desired. If desired, the releasable adhesive may be directly coated on the metal foil and the paper omitted.

The record members of the invention may be produced by a conventional paper-making process in which the ferromagnetic powder particles are mixed with a dilute slurry of paper-making fibers suspended in less than about 1% concentration in liquid and the mixture poured onto a filter carrier such as a Fourdrinier wire where the liquid, usually water, drains through leaving the fibers which interfelt to form a web in which the powder particles are retained. The drainage may be followed by suction steps in which additional liquid is expressed from the web leaving it in a coherent form in which it can be removed from the wire and transferred to a flexible porous carrier such as an elongated felt belt and dried as by passing over steam-heated cylinders. When the water content of the web is brought to the desired value, it resembles paper in appearance. The surface of the sheet is then smoothed as by a calendering operation by pressing it between polished rolls which may be heated, pressed together and operated so that one of the rolls is driven from an external source and drives the other roll through the intervening paper thereby producing a certain amount of slippage between the rolls very effective for compacting, densifying and leveling the surface of the paper.

According to the invention the finished record member should have a thickness of not more than about 3 mils and should be strong enough to resist breakage by reeling operations of the kind employed during transducing. The fibers from which the record member is made may be any of the conventional paper-making fibers including Kraft, sulfite, soda and groundwood or other pulps or any combination of two or more of these types. Kraft pulp is preferred inasmuch as it makes a strong paper and is otherwise quite suitable. With the other types of fiber, greater fiber lengths and/or more intensive beating of the fibers may be used for added strength. A good formulation of the pulp includes some relatively long fibers to contribute high strength, together with the conventional Kraft fibers of shorter length for imparting the desired uniformity and compactness.

The ferromagnetic powder of the record medium of the invention has a particle size of the order of one micron or less as explained above, and may be formed of any stable composition such as magnetic iron oxide or any of the ferromagnetic metals, the iron-aluminum nickel-cobalt alloys commercilized under the name of Alnico, for example. The relatively small cost and lower density of magnetic iron oxide, as well as the higher degree to which it is retained with the fibers during the paper formation steps makes this material preferable.

The fiber slurry may also contain bonding agents for firmly anchoring the powder particles within the finished recording medium to counteract any tendency to dusting out of the filler especially when the medium is being reeled past the transducing head, an operation which subjects the record medium to bending and scraping actions. Resins which can be precipitated on the fibers in the slurry such as those of the phenol-formaldehyde and modified phenol-formaldehyde types, as well as urea-formaldehyde and modified urea-formaldehyde condensations polymerized to the extent that they are effectively retained with the fibers, coumarone-indene resins, alkyds, polymerized ethylenes such as pentadiene, vinyl compounds, etc., regenerated cellulose, cellulose esters and ethers, casein, any of the gums such as rubber latex, resins and their natural and synthetic analogues, soaps, starches and glue or gelatin, are effective in this respect. Combinations of any two or more of these bonding agents are also suitable.

The resins, gums, soaps and casein should be dissolved or emulsified in the pulp slurry and precipitated as by the addition of suitable quantities of acid salts, ferric sulfate or paper makers alum for example. The emulsion or solution of the resins and gums are generally alkaline and are unstable at low pH, depositing the suspended or dissolved material on the pulp fibers in very adherent form. Starches should be swollen in a dispersion of the filler so that the starch particles gel around the filler particles, after which the gel may be disintegrated, diluted, mixed with the pulp fibers and acidified in accordance with the technique described in U. S. Patent No. 2,140,394. Glue or gelatin should be added in conjunction with formaldehyde or other insolubilizing agent and is best used together with one or more additional bonding agents. The bonding agents may be plasticized to exhibit the desired bonding and flexibility characteristics. Any of the well known compatible plasticizers may be used in a normal concentration of about 10–20% by weight. For example a cellulose acetate bonding composition may include triphenyl phosphate, dibutyl phthalate or sucrose octa-acetate in the above concentration range.

In some cases, such as for example—where the bonding material contains chlorine, undesirable reactions may take place between the added ferro-magnetic oxides and the bonding material—or the solvent used for the bonding material. To overcome such difficulties, the magnetic powder material is pretreated prior to its incorporation into the bonding composition so as to suppress undesirable reactions. Thus, ferromagnetic oxides which are to be incorporated into compositions containing vinyl chloride are treated with alkaline reacting material, such as sodium hydroxide, sodium perborate, sodium silicate, sodium carbonate, sodium acetate, sodium chromate, sodium thiosulphate, and trisodium and disodium phosphates. In addition, similar derivatives of potassium, calcium, barium, magnesium, or strontium are effective for such protective treatment if they are water-soluble. The amount of the alkaline material which is added to the magnetic material can be varied depending upon the result desired, and the solution into which it is to be incorporated. Generally less than 1% of the alkaline material will be sufficient for providing the magnetic powder particles with the required protective surface treatment. The alkaline material may be applied to the magnetic powder in any known way. For example, the magnetic powder may be sprayed with a solution of the alkaline material, or the magnetic powder may be dipped into a solution of the alkali material, or a relatively concentrated solution of the alkaline material may be mixed with the magnetic powder to form a thick paste.

Below is given an example of such treatment:

A concentrated solution of sodium phosphate in water is prepared. 100 grams of magnetic iron oxide are mixed with enough of the alkaline solution to leave about 4 to 6% of trisodium phosphate in the iron oxide. After a thorough mixing, the water is evaporated, leaving the magnetic particles coated with trisodium phosphate. This coated pigment may then be dispersed in a vinyl polymer solution and applied to an unfinished paper.

The amount of ferromagnetic powder in the finished record medium may vary in the general range of from about 8 to about 25% or more by volume of the total. In the case of magnetic iron oxides the weight percentage range is from about 30 to about 65%.

The higher concentrations of filler produce papers having low tensile strength so that appropriate measures should be taken with these high filler content papers to assure satisfactory performance. The paper can be made thicker, lonk fibered pulp fibers and more intensive fiber beating operations can be employed, and the bonding agent concentration can be adjusted for added strength.

The drainage and suction of water from the web cause appreciable filler losses so that the initial powder concentration of the paper forming mix is made slightly higher to compensate. The exact amount of compensation depends on the formulation and can be readily determined in a trial run.

The calendering or smoothing of the surface of the record medium is an important feature. Its omission lowers the playback response excessively and necessitates greater increased bias currents for satisfactory operation. The smoothing need not be effected in a calender, flint glazing, or burnishing with revolving polishing rollers being also suitable.

The paper forming steps may likewise take place on other types of machines such as cylinder machines and may even be made by hand where the record member is of the type having a compact form such as the rectangular sheets shown in the co-pending Begun application, Serial No. 753,328, filed June 7, 1947.

According to another phase of the invention the bonding agents may be partly applied after the paper formation has been started. For example while the paper is being dried or after most of the water has been removed by drainage and suction on the wire, the bonding agent may be applied in water dispersed or in undiluted form. All or nearly all of the bonding agent so applied is retained in the paper inasmuch as a comparatively small amount of the residual water is removed by later draining or expressing, evaporation being the principal manner of subsequent water removal.

Additionally water-soluble bonding agents may be effectively added in this manner without requiring precipitation.

The bonding agent may be added in the form of a spray or stream of liquid while the web is on the wire at the dandy roll or couch roll; while in the drier or when adjusting the water content of the sheet preparatory to calendering.

A high degree of calendering is advisable to bring out the best magnetic transducing properties and to make the fibrous surface extremely smooth and compact. A final super calendering step is especially effective.

The narrow tape form of record member as shown in the above-mentioned Dank application for example, is prepared by first forming a wide sheet and then slitting it into the individual narrow widths which can be wound into individual coils for distribution.

The following is an example of one specific method for preparing the record medium of the invention. An unbleached Kraft pulp was beaten for about one hour with the roll set to produce Schopper-Riegler freeness of about 800. The bedplate was then raised and 55% by weight (based on the dry pulp) of finely powdered magnetic (black) iron oxide added together with about 4% casein in the form of alkali dissolved protein. The beating was continued to uniformly mix the ingredients after which the pH was adjusted to about 6 with ferric sulfate and the mass was dropped into a chest and diluted with water to about ½% fiber concentration by weight.

The slurry so prepared was then formed on a conventional Fourdrinier wire to make a final sheet about 2 mils thick, dried, adjusted to about 10% water content and calendered in a nine roll stack and slit into one-quarter inch widths.

The finished record medium was 0.0018 inch thick, had a filler concentration of about 49% and had a breaking strength of about 40 ounces. Its playback response characteristics were excellent having substantially the same frequency distribution as the best coated tape made according to the co-pending Kornei application, Serial No. 685,092, filed July 20, 1946. The maximum output of the filled tape was slightly higher, however, and the cost of its preparation much lower in view of the elimination of the extra coating operation.

In another run substantially the same procedure was followed except that in place of three-fourths of the casein, 5% starch was substituted, the dissolved casein being mixed first with the magnetic iron oxide in water to disperse the filler, after which the starch was added and jelled to coagulate in the dispersion. The entire mixture was then added to the fiber slurry in the beater, mixed further to homogenize the mass and dumped. Additionally about 2% of soluble urea-formaldehyde condensation product was sprayed onto the sheet as it emerged from the drier.

The final one-quarter inch tape had substantially the same magnetic characteristics with slightly less breaking strength.

The incorporation of resins such as urea-formaldehyde condensations or those of the melamine type are especially advantageous in inhibiting the dimensional changes of the finished paper with changes in humidity. The urea-formaldehyde when applied to the paper in incompletely resinified form should be permitted to complete its condensation, as for example by incorporating a condensing catalyst in the paper and maintaining the paper in heated condition as for example by passage through the drier. Condensation will also be applied in the presence of the catalyst by merely permitting the paper to stand around at room temperature for a sufficient period of time. Catalysts such as ammonium phosphates are decomposed to liberate ammonia and generate acid phosphates which are especially effective. Other acids or acid salts may also be employed as condensing catalysts, but care should be taken that the temperature of the paper with the stronger acids or acid salts should not be permitted to rise unduly. Excessive heating in the presence of acid will normally tend to weaken the paper.

During the paper forming operation the drainage of the water from the paper web is generally vigorous enough to remove an appreciable amount of the finely divided magnetic powder from the web. This loss of filler is generally greatest on the bottom or wire side of the web so that the finished paper may have a slightly different filler content adjacent its two faces. Where this two-sidedness is to be avoided, an additional application of filler suspension with or without added fibers may be made to the less filled surface. The web may be passed for example over a roller applicator which dips into the filler suspension and applies additional filler to the lower surface of the web either before, during or after the drying operation. The web may also be inverted as by reversing its direction of motion so that the less filled surface is on top and the extra filler application is made from the top as by spraying.

The two-sided paper having a greater magnetic powder concentration adjacent one surface may also be used in accordance with the invention without compensatory treatment to equalize the faces. The finished record track may be used with either of its faces in contact with the magnetic core as shown in Figs. 2 and 2—A for example, whether or not these faces are of identical filler concentration. The only significant effect of the two-sidedness is that the playback response from one face of the record track is of slightly different amplitude than from the other. The frequency response characteristics, however, are substantially unaffected, so that the same high fidelity may be obtained from either face.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

The principles of the invention explained in connection with specific exemplifications thereof will suggest to those skilled in the art many other applications and modifications of the same. It is accordingly desired that the appended claims be construed broadly, and that they shall not be limited to the specific details shown and described in connection with exemplifications thereof.

I claim:

1. In a method of preparing a magnetic record member for transducing signals by magnetic flux interlinkage of successive portions with a magnetic record transducing head, the steps comprising: mixing powdered permanently magnetizable iron oxide having a particle size of about one micron with a slurry of paper making fibers containing a bonding agent in the proportion of from 8 to 25 percent iron oxide by volume of the total solids; forming a paper about two to three mils thick from the resulting mixture; and calendering the paper so formed.

2. In a method of producing a magnetic record member for transducing signals by magnetic flux interlinkage of successive portions with a magnetic record transducing head, the steps comprising: mixing permanently magnetizable powder particles having a particle size of about one micron with a slurry of paper-making fibers containing a bonding agent in the proportion of from 8 to 25 percent iron oxide by volume of the total solids; forming a paper about two to three mils thick from the slurry; and calendering at least one surface of the paper to give it a high degree of smoothness.

3. In a method of producing a magnetic record member for transducing signals by magnetic flux interlinkage of successive portions with a magnetic record transducing head, the steps comprising: mixing permanently magnetizable powder particles having a particle size of about one micron with a slurry of paper-making fibers containing a bonding agent in the proportion of from 8 to 25 percent iron oxide by volume of the total solids; forming a paper about two to three mils thick from the slurry; depositing an additional stratum of permanently magnetizable powder particles over one surface of the paper as it is formed while the surface of the paper web is still wet; and calendering said one surface to impart a smooth exterior surface to said one surface of the paper on which the additional stratum of powder has been deposited.

OTTO KORNEI.

REFERENCES CITED

The following references are of record in the file of this patent:

22

UNITED STATES PATENTS

| Number | Name | Date |
|---|---|---|
| 380,515 | Pennington | Apr. 3, 1888 |
| 1,514,406 | Taylor | Nov. 4, 1924 |
| 1,847,860 | Best | Mar. 1, 1932 |
| 1,949,840 | Languepin | Mar. 6, 1934 |
| 2,380,392 | Begun | July 31, 1945 |
| 2,396,409 | Berzer | Mar. 12, 1946 |

OTHER REFERENCES

Manufacture of Pulp and Paper, published by McGraw-Hill Book Co., New York, 2d edition, vol. IV, section 4, page 13 (1928), and 3d edition, vol. IV, section 6, page 19 (1938).